(12) United States Patent
Westrup et al.

(10) Patent No.: US 10,673,520 B2
(45) Date of Patent: Jun. 2, 2020

(54) CELLULAR COMMAND, CONTROL AND APPLICATION PLATFORM FOR UNMANNED AERIAL VEHICLES

(71) Applicants: Verizon Patent and Licensing Inc., Arlington, VA (US); Skyward IO, Inc., Portland, OR (US)

(72) Inventors: Warren J. Westrup, Irving, TX (US); Joe Cozzarelli, Whippany, NJ (US); Eric T. Ringer, Portland, OR (US); Derek Wade Ohlarik, Flemington, NJ (US); Mauricio Pati Caldeira de Andrada, South Plainfield, NJ (US); David B. Murray, Fanwood, NJ (US); X, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 101 days.

(21) Appl. No.: 15/806,044

(22) Filed: Nov. 7, 2017

(65) Prior Publication Data
US 2018/0359021 A1 Dec. 13, 2018

Related U.S. Application Data

(60) Provisional application No. 62/517,081, filed on Jun. 8, 2017.

(51) Int. Cl.
*H04B 7/185* (2006.01)
*G06F 8/60* (2018.01)
*G06F 9/54* (2006.01)
*H04W 76/10* (2018.01)

(52) U.S. Cl.
CPC .......... *H04B 7/18506* (2013.01); *G06F 8/60* (2013.01); *G06F 9/54* (2013.01); *H04W 76/10* (2018.02)

(58) Field of Classification Search
CPC .... H04B 7/18506; G08G 5/00; G08G 5/0047; G08G 7/00
See application file for complete search history.

(56) References Cited

U.S. PATENT DOCUMENTS

| | | | |
|---|---|---|---|
| 9,891,631 B1* | 2/2018 | Hanlon | G05D 1/0816 |
| 2006/0167597 A1* | 7/2006 | Bodin | G01C 21/005 |
| | | | 701/3 |
| 2017/0372617 A1* | 12/2017 | Bruno | G08G 5/0039 |
| 2018/0067493 A1* | 3/2018 | Pilskalns | G05D 1/0094 |
| 2018/0082308 A1* | 3/2018 | Gong | G06F 16/29 |
| 2018/0096588 A1* | 4/2018 | Shabah | H04W 4/90 |
| 2018/0139276 A1* | 5/2018 | Raghupathy | H04W 52/0209 |
| 2018/0157255 A1* | 6/2018 | Halverson | B64C 39/024 |
| 2018/0268719 A1* | 9/2018 | Guan | G08G 5/0034 |

* cited by examiner

*Primary Examiner* — Omer S Mian

(57) ABSTRACT

A device can be configured to detect a physical connection with an unmanned aerial vehicle (UAV) flight controller through an interface. The device can identify a UAV identifier associated with the UAV flight controller and determine, based on the UAV identifier, an application programming interface (API) for communicating with the UAV flight controller. Using the API, the device can establish a communications link with the UAV flight controller and perform an action based on the communications link.

20 Claims, 5 Drawing Sheets

CELLULAR COMMAND, CONTROL AND APPLICATION PLATFORM FOR UNMANNED AERIAL VEHICLES

RELATED APPLICATION(S)

This application claims priority under 35 U.S.C. § 119 to U.S. Provisional Patent Application No. 62/517,081, filed on Jun. 8, 2017, the content of which is incorporated by reference herein in its entirety.

BACKGROUND

An unmanned aerial vehicle (UAV) is an aircraft without a human pilot aboard. UAVs have many applications for industry, media, hobbyists, and the like. Some UAVs are controlled using relatively short-range signaling within a line of sight of the UAV. Such control is sometimes referred to as visual line of sight (VLOS).

DETAILED DESCRIPTION OF PREFERRED EMBODIMENTS

Figure 1:
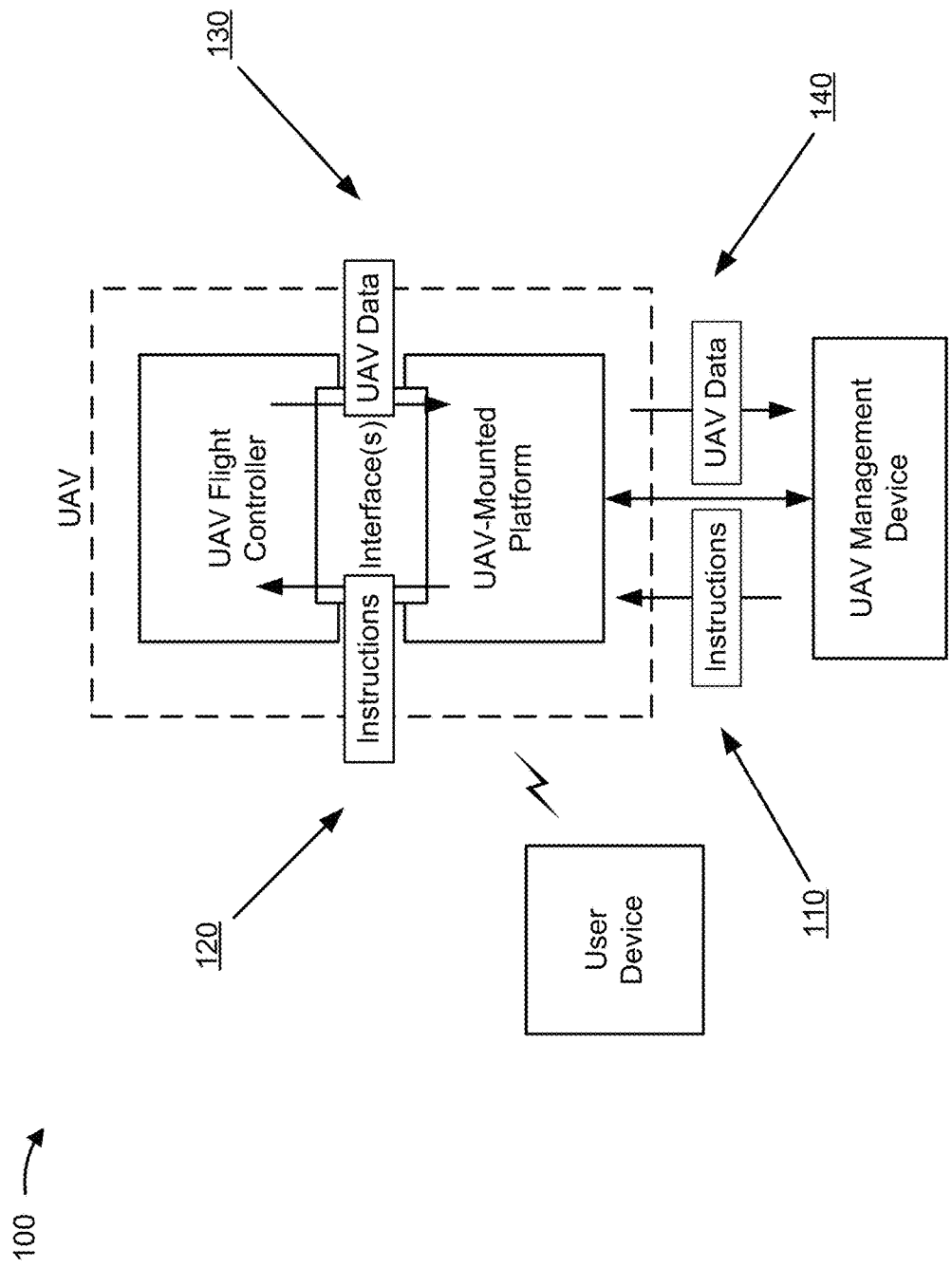
FIG. 1 is a diagram of an overview of an example implementation described herein.

The following detailed description of example implementations refers to the accompanying drawings. The same reference numbers in different drawings can identify the same or similar elements.

Unmanned aerial vehicles (UAVs, sometimes referred to as drones) are often controlled by a human operator using VLOS control. However, some UAV uses might not be amenable to VLOS control. For example, it can be impractical to perform certain long-range applications using VLOS control. Also, UAVs and/or users of UAVs might benefit from onboard applications such as streaming video applications, sensor applications, black box functionality, and/or the like.

Implementations described herein provide a UAV-mounted platform capable of communicating with the UAV and a wide area network (WAN), such as a Long Term Evolution (LTE) network. For example, the UAV-mounted platform can include a user equipment (UE) with an LTE module (e.g., a Cat-1 module, a Cat-4 module, and/or the like). Thus, the UAV-mounted platform enables beyond VLOS (BVLOS) command and control of the UAV. The UAV-mounted platform can further include an operating system and one or more applications to facilitate BVLOS command and control, and to provide application functionality for the UAV, such as sensor functionality, global positioning satellite (GPS) functionality, an Internet of Things (IoT) network interface, a ground control station interface, black box functionality, and extensibility (e.g., based on a widely available operating system or development environment, such as Android). Furthermore, the UAV-mounted platform can be configured to interface with many, different types of UAVs, rather than be custom-configured for a particular UAV.

In this way, a relatively low-cost (e.g., relative to custom configuration of a drone-mounted UE) and versatile platform provides BVLOS functionality and applications that might be useful to UAV operators hoping to perform BVLOS control. Furthermore, the UAV-mounted platform can provide useful data for interested parties, such as UAV operators, auditors, insurance companies, regulatory entities, and the like.

In some implementations, the UAV-mounted platform can include an application suite (sometimes referred to as a command and control module) to facilitate BVLOS control of the UAV. The application suite can execute on a customized operating system, such as a headless version of Android (e.g., a version of Android customized to remove user interfaces and some user-related functionality). Additionally, or alternatively, the application suite and/or the operating system can operate on a reduced instruction set computer (RISC), such as an advanced RISC machine (ARM) processor and/or the like. Furthermore, the application suite can have interfaces for external sensors (e.g., based on an IoT networking interface, direct interfaces with the sensors, and/or the like).

In some implementations, the application suite and/or the UAV-mounted platform can enable remote updating of firmware, software, or applications associated with the UAV-mounted platform. For example, in a large fleet of UAVs, it can be expensive, time-consuming, and error-prone to manually propagate such updates to UAVs. The UAV-mounted platform's WAN connection can facilitate provision of updates, and the application suite and/or operating system can enable automatic implementation of such updates without user intervention. In this way, software, firmware, and application updates can be propagated to UAVs (and/or UAV-mounted platforms) in a zero-touch fashion without user intervention.

In some implementations, the application suite and/or the UAV-mounted platform can enable BVLOS monitoring, verification, and/or alteration of a flight path of the UAV. For example, the UAV can have an onboard flight controller capable of controlling a flight path or behavior of the UAV, which can be separate from the command and control module of the UAV-mounted platform. The UAV-mounted platform can use sensors of the UAV-mounted platform to determine whether the flight path or behavior of the UAV matches an expected flight path or behavior (e.g., to determine whether the onboard flight controller is behaving properly), and can report information regarding this determination to an observer (e.g., using the WAN connection of the UAV-mounted platform). Additionally, or alternatively, the UAV-mounted platform can take control of the UAV to ground the UAV, to return the UAV to an expected flight path or behavior, and/or the like. Additionally, or alternatively, the UAV-mounted platform can provide information identifying an observed flight path or behavior of the UAV to an observer, and the observer can provide information to the UAV-mounted platform indicating whether to perform an action with regard to the UAV, or whether to cause the UAV to perform an action.

The following detailed description of example implementations refers to the accompanying drawings. The same reference numbers in different drawings can identify the same or similar elements.

FIG. 1 is a diagram of an overview of an example implementation 100 described herein. As shown in FIG. 1, example implementation 100 can include a user device, a UAV management device, and a UAV, which includes a UAV flight controller and a UAV-mounted platform.

As shown in FIG. 1, and by reference number 110, the UAV-mounted platform receives instructions from a UAV management device. For example, the UAV-mounted platform can receive, from the UAV management device, instructions to cause the UAV to perform an action, such as altering a flight path of the UAV, activating and/or deactivating one or more UAV motors, updating UAV software, capturing an image from a camera on-board the UAV, and/or the like.

As further shown in FIG. 1, and by reference number 120, the UAV-mounted platform can send instructions (e.g., instructions based on the instructions received from the UAV management device) to the UAV flight controller. In some implementations, the UAV-mounted platform can include a command and control module that uses a UAV flight controller application programming interface (API) to convert the instructions received from the UAV management device to instructions for the UAV flight controller. The converted instructions can be communicated to the UAV flight controller, for example, using an interface, such as a universal asynchronous receiver transmitter (UART) interface, RS232 interface, or universal serial bus (USB) interface. The instructions provided to the UAV flight controller can cause the UAV to perform an action (e.g., capture an image, go to a waypoint, and/or the like).

As further shown in FIG. 1, and by reference number 130, the UAV-mounted platform can receive UAV data from the UAV flight controller, (e.g., provided though an interface, such as an RS232 or USB interface). The UAV data can be any data associated with the UAV, including data obtained from UAV sensors in communication with the UAV flight controller. For example, the UAV data might include a wind speed measurement from an anemometer of the UAV, video data from a camera of the UAV, location data from a GPS module of the UAV, software version data specifying a version of software installed on the UAV flight controller, and/or the like.

As further shown in FIG. 1, and by reference number 140, the UAV-mounted platform can provide UAV data to the UAV management device. In some implementations, the UAV data provided to the UAV management device can be the same UAV data provided by the UAV flight controller. For example, a wind speed measurement provided to the UAV-mounted platform by the UAV flight controller can be provided to the UAV management device, e.g., using an LTE module of the UAV-mounted platform.

In some implementations, the UAV data provided to the UAV management device is generated by the UAV-mounted platform. For example, one or more applications running on the UAV-mounted platform can generate data (e.g., using the UAV data provided by the UAV flight controller) to provide to the UAV management device. By way of example, the UAV-mounted platform can receive, from the flight controller, image data from a camera connected to the UAV. An application running on the UAV-mounted platform can process the image data and provide the processed data to the UAV management device.

Accordingly, the example implementation 100 depicts a UAV-mounted platform that can provide a variety of features, including custom applications and BVLOS functionality that can be created once, for the UAV-mounted platform, and used on many different types of UAVs. The BVLOS functionality might improve UAV operating safety (e.g., by permitting BVLOS command and control, and by including applications for promoting safety, such as collision avoidance applications, weather monitoring applications, and the like) and efficiency (e.g., by permitting BVLOS command and control, BVLOS software and firmware updates, applications for air traffic control, and the like). Furthermore, the UAV-mounted platform can make use of applications that can provide a variety of features for a variety of interested parties, such as UAV operators, auditors, insurance companies, regulatory entities, and the like. Applications operating on the UAV-mounted platform can, in some implementations, be UAV agnostic, allowing application developers to reach a wider potential audience of UAV owners/operators and providing UAV owners/operators with a similar user experience when using multiple different types of UAVs.

As indicated above, FIG. 1 is provided merely as an example. Other examples are possible and can differ from what was described with regard to FIG. 1.

Figure 2:
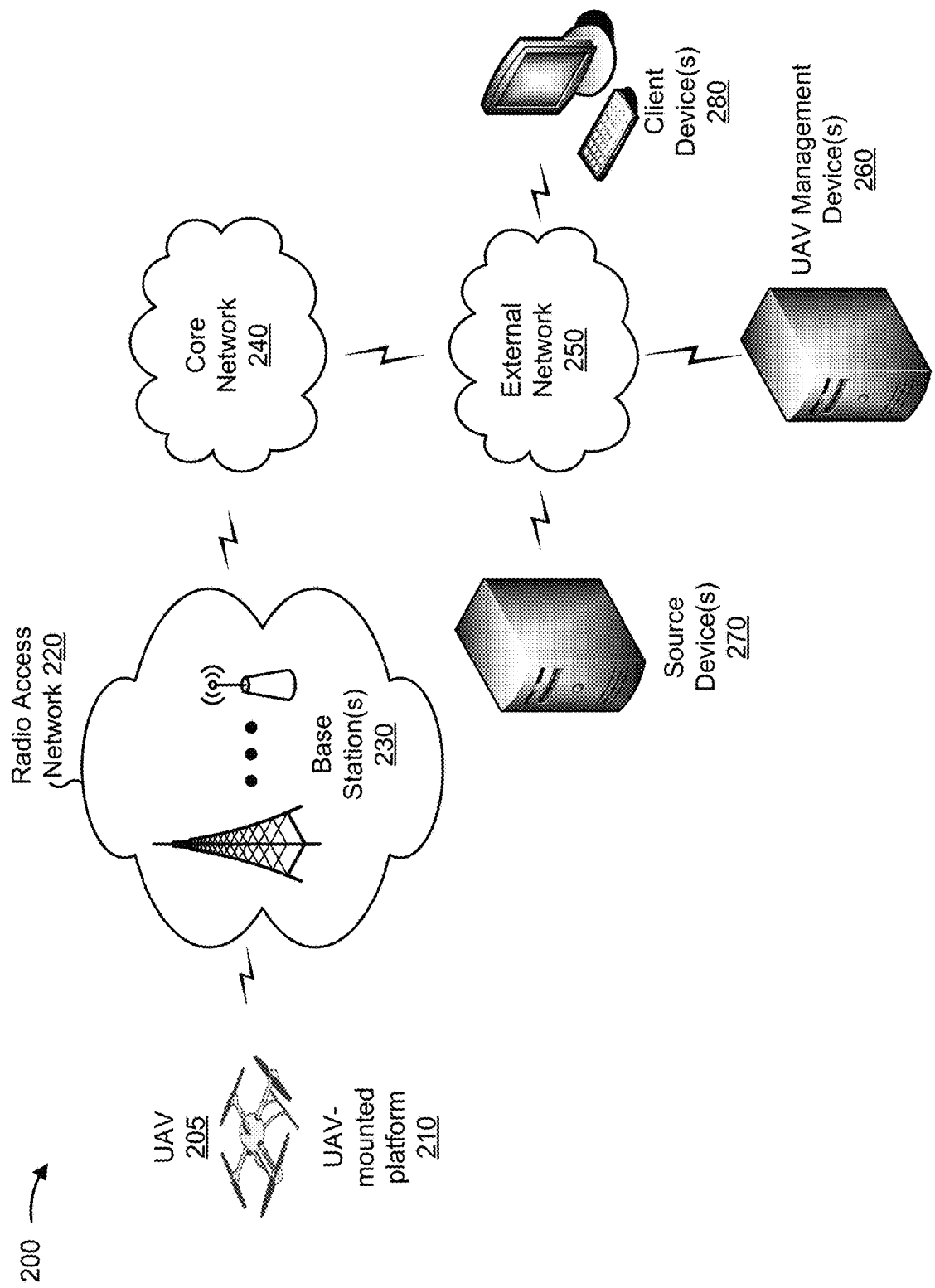
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a UAV 205, UAV-mounted platform 210, a radio access network (RAN) 220, one or more base stations 230 (hereinafter referred to individually as "base station 230," and collectively as "base stations 230"), a core network 240, an external network 250, a UAV management device 260, one or more source devices 270, and one or more client devices 280. Devices of environment 200 can interconnect via wired connections, wireless connections, or a combination of wired and wireless connections.

UAV 205 includes aircraft without a human pilot aboard, and can also be referred to as an unmanned aircraft (UA), drone, remotely piloted vehicle (RPV), remotely piloted aircraft (RPA), or remotely operated aircraft (ROA). UAV 205 can have a variety of shapes, sizes, configurations, characteristics, etc. for a variety of purposes and applications. In some implementations, UAV 205 can include one or more sensors, such as an electromagnetic spectrum sensor (e.g., visual spectrum, infrared, or near infrared cameras, radar systems, etc.), a biological sensor, a temperature sensor, a chemical sensor, a humidity sensor, a pressure sensor, and/or the like. In some implementations, UAV 205 can include one or more components for communicating with UAV-mounted platform 210. For example, UAV 205 can transmit information to and/or can receive information from UAV-mounted platform 210, such as sensor data, flight plan information, and/or the like.

In some implementations, UAV 205 can include a flight controller that manages UAV functionality, such as motor functionality, power functionality, navigation functionality, communications functionality, and/or sensor functionality. For example, a UAV flight controller can be a processing device that communicates with other devices or modules of the UAV 205 to perform UAV functions such as those described above. UAV 205 can include, in some implementations, one or more interfaces for an external device (e.g., UAV-mounted platform 210) to interface with a flight controller of UAV 205. Example interfaces of UAV 205 and/or UAV-mounted platform 210 can include wired or wireless interfaces, such as USB, RS232, micro USB, inter-integrated circuit ($I^2C$), Bluetooth, Wi-Fi, near field communications (NFC), and/or the like.

UAV-mounted platform 210 can be detachably connected, or mounted, to UAV 205 and can include one or more devices for providing BVLOS functionality to UAV-mounted platform 210 and/or UAV 205. For example, UAV-mounted platform 210 can include components such as a UE, an ARM-based central processing unit (CPU), one or more interfaces (e.g., USB, I²C, RS232, etc.) for interfacing with UAV 205, an LTE component, a power and/or battery component, one or more sensor components, a GPS component, an IoT network interface, a light detection and ranging (LIDAR) component, a data storage component, and/or the like. Physically, UAV-mounted platform 210 can be implemented in a variety of forms, and the size and weight of UAV-mounted platform 210 can vary depending on the components included in UAV-mounted platform 210 and materials used for construction. An example UAV-mounted platform 210 can be included in a polymer-based housing that is 5 inches by 2 inches by 1.5 inches, with a total weight of less than or equal to 5 ounces, including the battery.

In some implementations, UAV-mounted platform 210 can include one or more components for communicating with base station(s) 230. Additionally, or alternatively, UAV-mounted platform 210 can transmit information to and/or can receive information from UAV management device 260, such as sensor data, flight plan information, and/or the like. Such information can be communicated via base station 230, core network 240, and/or external network 250.

RAN 220 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., an LTE RAN, an LTE-Advanced (LTE-A) RAN, an LTE-unlicensed (LTE-U) RAN, etc.), and/or the like. RAN 220 can include one or more base stations 230 that provide access for UAV-mounted platforms 210 to core network 240.

Base station 230 includes one or more devices capable of transferring traffic, such as audio, video, text, and/or other traffic, destined for and/or received from UAV-mounted platform 210. In some implementations, base station 230 can include an evolved NodeB (eNB) associated with an LTE radio access network (RAN) that receives traffic from and/or sends traffic to UAV management device 260 and/or client device 280 via core network 240. Additionally, or alternatively, one or more base stations 230 can be associated with a RAN that is not associated with the LTE network. Base station 230 can send traffic to and/or receive traffic from UAV 205 via an air interface. Base station(s) 230 can include different types of base stations, such as a macro cell base station or a small cell base station, such as a micro cell base station, a pico cell base station, and/or a femto cell base station. A macro cell base station can cover a relatively large geographic area (e.g., several kilometers in radius). A small cell base station can be a lower-powered base station, as compared with a macro cell base station that can operate in the same or different (e.g., licensed, unlicensed, etc.) frequency bands as macro cell base stations.

Core network 240 includes a network that enables communications between RAN 220 (e.g., base station(s) 230) and one or more devices and/or networks connected to core network 240. For example, core network 240 can include an evolved packet core (EPC). Core network 240 can include one or more mobility management entities (MMEs), one or more serving gateways (SGWs), and one or more packet data network gateways (PGWs) that together provide mobility functions for UAV-mounted platforms 210 and enable UAV-mounted platforms 210 to communicate with other devices of environment 200.

External network 250 includes one or more wired and/or wireless networks. For example, external network 250 can include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

UAV management device 260 includes one or more devices for managing UAV-mounted platforms 210 and/or flight plans for UAV-mounted platforms 210. For example, UAV management device 260 can include a server, a desktop computer, a laptop computer, or a similar device. In some implementations, UAV management device 260 can communicate with one or more devices of environment 200 (e.g., UAV-mounted platform 210, source device 270, client device 280, etc.), and to receive information to be used to analyze and/or recommend flight plans for UAV-mounted platforms 210, and/or to provide a recommendation. In some implementations, UAV management device 260 can permit control of UAV-mounted platform(s) 210 by a user who interacts with client device 280 to access UAV management device 260. In some implementations, UAV management device 260 can be included in a data center, a cloud computing environment, a server farm, and/or the like, which can include multiple UAV management devices 260. While shown as external from core network 240, in some implementations, UAV management device 260 can reside within core network 240.

Source device 270 includes one or more devices that act as data sources for information to be used by UAV management device 260 to manage UAV-mounted platform 210, including information used to analyze and/or recommend a flight plan. For example, source device 270 can include a server (e.g., in a data center, a cloud computing environment, etc.) and/or a similar type of device. In some implementations, source device 270 can store regulatory information, weather information, flight plan information, and/or the like.

Client device 280 includes one or more devices capable of providing information to be used by UAV management device 260 to manage UAV-mounted platform 210, including information used to analyze and/or recommend a flight plan. For example, client device 280 can include a desktop computer, a laptop computer, a tablet computer, a mobile phone, or a similar device. In some implementations, a user can interact with client device 280 to request a flight plan analysis and/or recommendation for a UAV-mounted platform 210 from UAV management device 260. UAV management device 260 can perform the analysis, and can provide the recommendation to client device 280.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
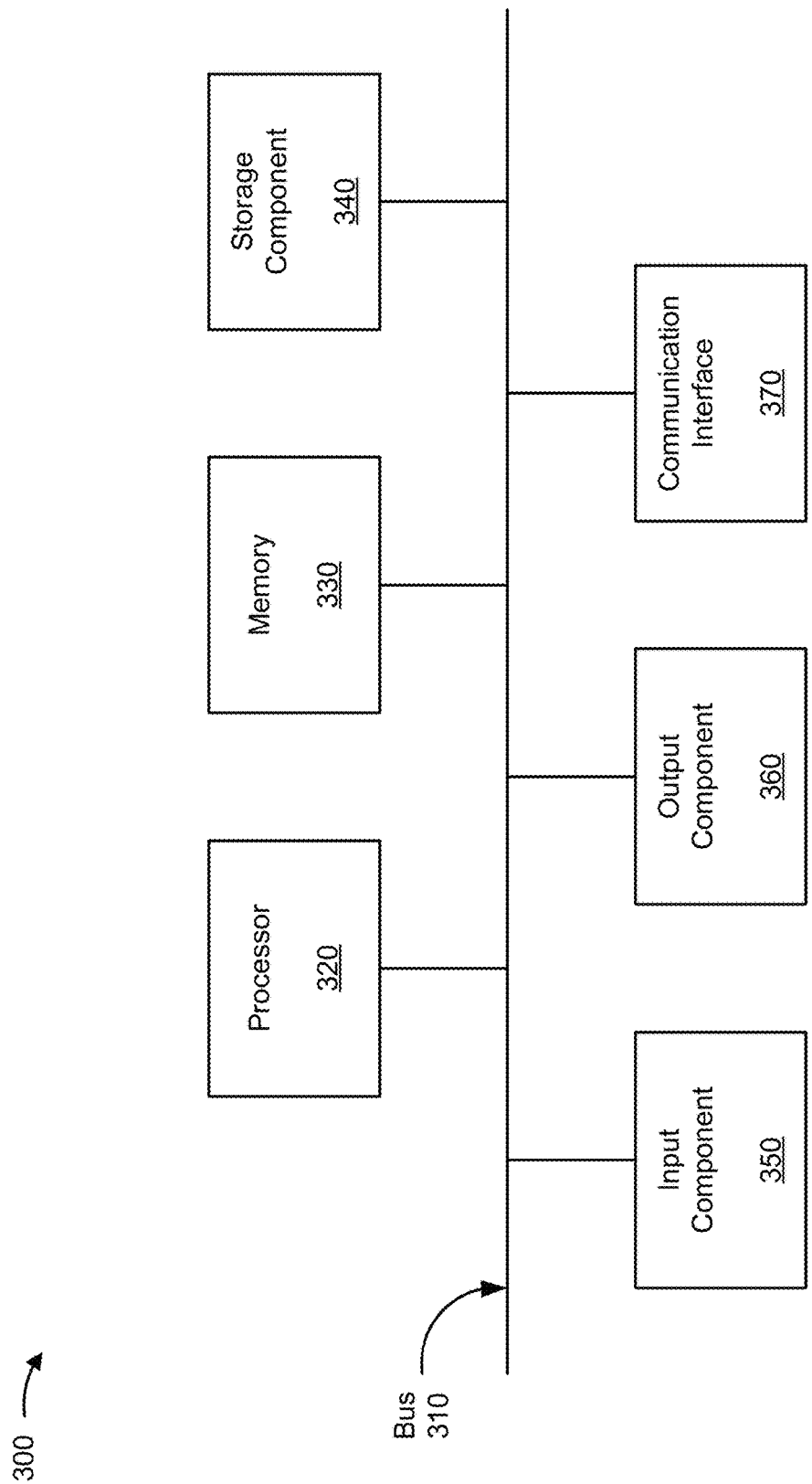
FIG. 3 is a diagram of example components of one or more devices of FIG. 2.

FIG. 3 is a diagram of example components of a device 300. Device 300 can correspond to UAV 205, UAV-mounted platform 210, base station 230, UAV management device 260, source device 270, and/or client device 280. In some implementations, UAV 205, UAV-mounted platform 210, base station 230, UAV management device 260, source device 270, and/or client device 280 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, USB interface, a Wi-Fi interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
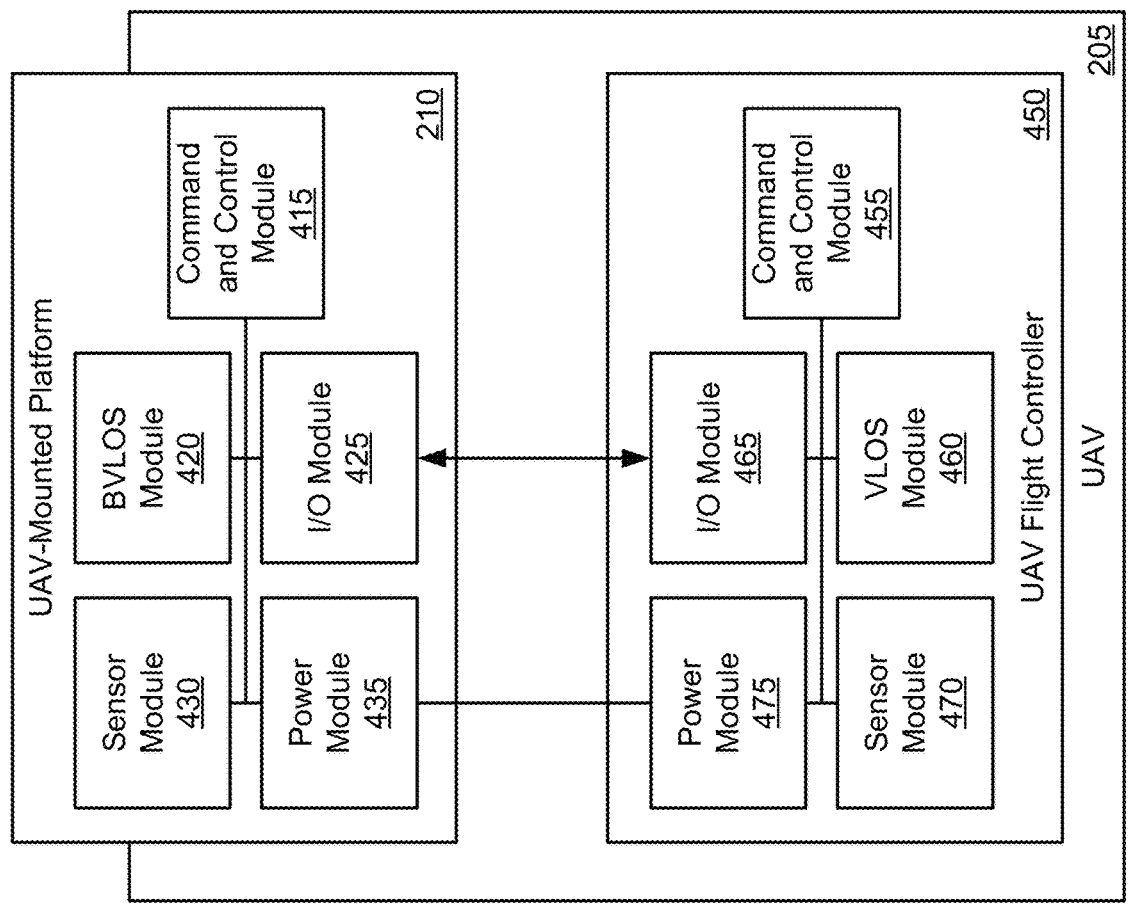
FIG. 4 is a functional block diagram of an example implementation of a cellular command, control, and application platform for unmanned aerial vehicles.

FIG. 4 is a functional block diagram 400 of an example implementation of a cellular command, control, and application platform for unmanned aerial vehicles. The block diagram 400 includes an example UAV-mounted platform 210 attached to UAV 205 and in communication with a UAV flight controller 450 of UAV 205. The example UAV-mounted platform 210 includes a command and control module 415, BVLOS module 420, input/output (I/O) module 425, sensor module 430, and power module 435. The example UAV flight controller 450 includes a command and control module 455, VLOS module 460, I/O module 465, sensor module 470, and power module 475. Modules 415-475 are implemented using hardware or a combination of hardware and software. In some implementations, one or more of modules 415-475 can be implemented by one or more components of a device, such as device 300, or include one or more components of device 300.

Command and control module 415 can communicate with other modules included in UAV-mounted platform 210 and/or UAV flight controller 450 (e.g., using I/O module 425) to facilitate the provision of BVLOS functionality for a UAV. For example, command and control module 415 can run an operating system and include one or more APIs for communicating with various components, or modules, of both UAV-mounted platform 210 and UAV flight controller 450. In some implementations, command and control module 415 can include one or more applications that enable BVLOS functionality (e.g., applications provided by UAV management device(s) 260, source device(s) 270, and/or client device(s) 280). In some implementations, command and control module 415 can include one or more processors and one or more volatile and/or non-volatile storage modules, such as, for example, ROM memory, RAM memory, Flash memory, a Subscriber Identity Module (SIM) card (e.g., a standard SIM card, a mini SIM card, a micro SIM card, and/or a nano SIM card), a secure digital (SD) card (e.g., a micro SD card), and/or the like. In some implementations, command and control module 415 may include data storage that provides black box functionality to the UAV.

BVLOS module 420 can communicate BVLOS signals to and from one or more other modules of UAV-mounted platform 210. For example, BVLOS module 420 can receive BVLOS radio signals from a device external to UAV-mounted platform 210 and UAV flight controller 450 and/or transmit BVLOS radio signals to a device external to UAV-mounted platform 210 and UAV flight controller 450

(e.g., external devices might include UAV management device(s) 260, source device(s) 270, and/or client device(s) 280). In some implementations, command and control module 415 can include one or more telecommunications devices, such as RAN communications components (e.g., LTE modem, antenna(s), and/or the like).

I/O module 425 includes one or more interfaces to enable communication with I/O module 465 of UAV flight controller 450. By way of example, I/O module 425 can include interfaces for communicating with UAV flight controller via UART, RS232, USB, micro USB, VC, Bluetooth, Wi-Fi, and/or the like. As another example, I/O module 425 can include an IoT network interface module for device to device communications. In some implementations, I/O module 415 can include a communications interface 370.

Sensor module 430 includes one or more sensors for obtaining sensor data, and communicating the sensor data to command and control module 415. For example, sensor module 430 can include a GPS sensor, a LIDAR sensor, a temperature sensor, a barometer, an accelerometer, a camera, and/or the like, which can provide output to command and control module 415 for use in BVLOS applications.

Power module 435 includes a power supply, power monitoring hardware and/or software, and/or a connector for receiving input power. For example, power module 435 can include a lithium-ion battery, switch-mode power supply, regulated step-down power supply, and/or the like. Power module 435 supplies power to the modules of UAV-mounted platform 210 and, in some implementations, can connect to power module 475 of UAV flight controller 450 (e.g., enabling power module 435 to receive power from and/or provide power to power module 475).

Turning now to UAV flight controller 450, command and control module 455 controls UAV 205 and the modules included in UAV 205. VLOS module 460 receives and transmits VLOS communications. I/O module 465 provides one or more interfaces for communicating with UAV-mounted platform 210. Sensor module 470 captures sensor data that can be used by UAV flight controller 450 and/or UAV-mounted platform 210. Power module 475 provides power to UAV flight controller 450 and, in some implementations, can include an interface for providing power to an external device, such as UAV-mounted platform 210.

The number and arrangement of components shown in FIG. 4 are provided as an example. In practice, UAV-mounted platform 210 and/or UAV flight controller 450 can include additional components, fewer components, different components, or differently arranged components than those shown in FIG. 4. Additionally, or alternatively, a set of modules of UAV-mounted platform 210 can perform one or more functions described as being performed by another set of modules of UAV-mounted platform 210 and/or UAV flight controller 450. Likewise, a set of modules of UAV flight controller 450 can perform one or more functions described as being performed by another set of modules of UAV flight controller 450 and/or UAV-mounted platform 210.

Figure 5:
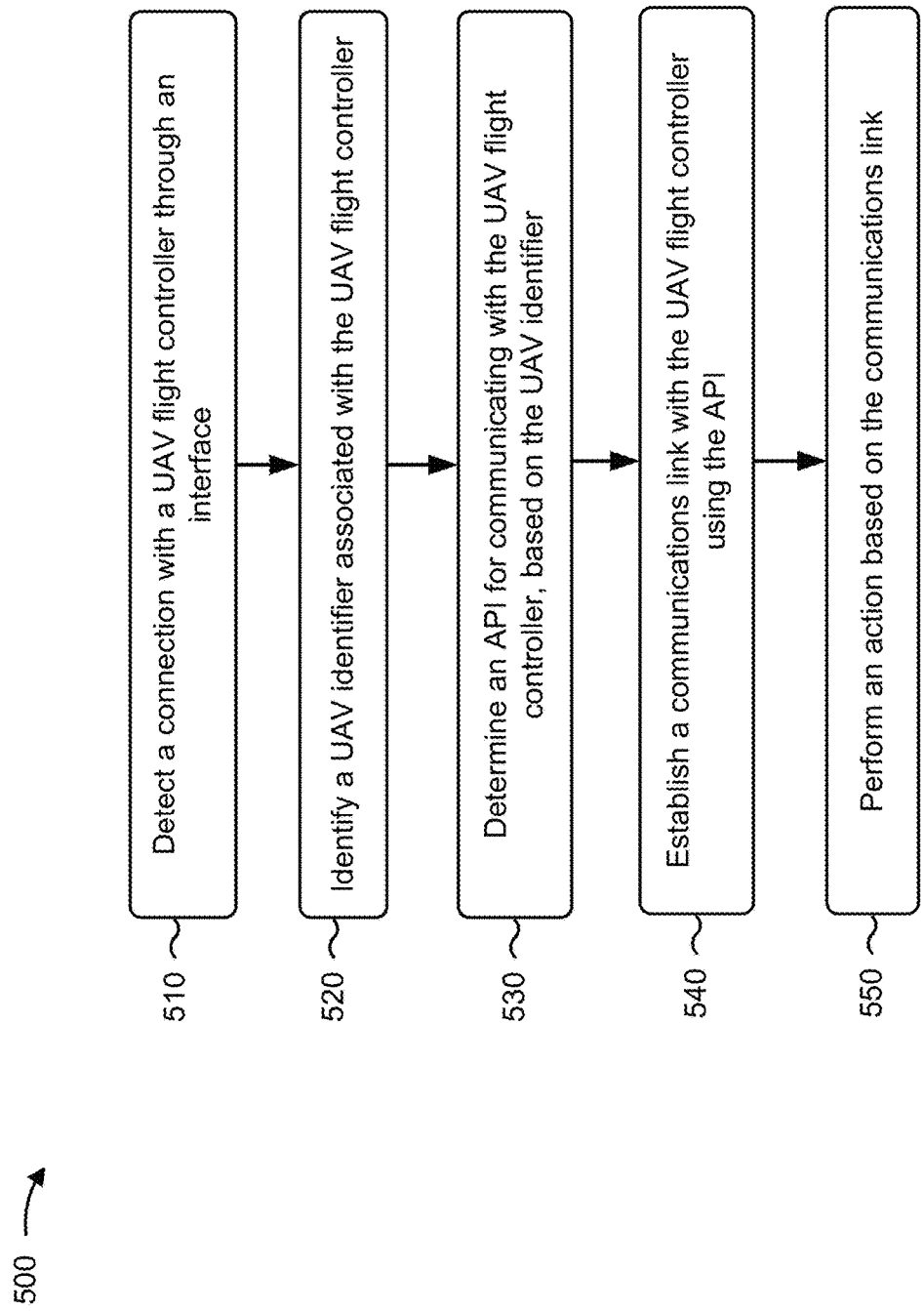
FIG. 5 is a flow chart of an example process for using a cellular command, control, and application platform for unmanned aerial vehicles.

FIG. 5 is a flow chart of an example process 500 for using a cellular command, control, and application platform for unmanned aerial vehicles. In some implementations, one or more process blocks of FIG. 5 can be performed by UAV-mounted platform 210. In some implementations, one or more process blocks of FIG. 5 can be performed by another device or a group of devices separate from or including UAV-mounted platform 210, such as UAV 205, base station(s) 230, UAV management device (s) 260, source device(s) 270, and/or client device(s) 280. In some implementations, one or more process blocks of FIG. 5 can be performed by one or more modules, such as command and control module 415, BVLOS module 420, I/O module 425, sensor module 430, and/or power module 435.

As shown in FIG. 5, process 500 can include detecting a connection with a UAV flight controller through an interface (block 510). For example, a command and control module of UAV-mounted platform 210 can detect a wired or wireless connection between an I/O module of UAV-mounted platform 210 and an I/O module of the UAV flight controller. Wired or wireless connections can include, for example, connection via UART, RS232, USB, micro USB, I²C, Bluetooth, NFC, Wi-Fi, and/or the like. By way of example, a UART connector of UAV-mounted platform 210 can be plugged in to a UART port of UAV 205 or the UAV flight controller. The connection between UAV-mounted platform 210 and UAV flight controller can, for example, enable communications between the UAV flight controller of UAV 205 and the command and control module of UAV-mounted platform 210.

In some implementations, UAV-mounted platform 210 can detect a connection between a power module of UAV-mounted platform 210 and a power module of UAV 205. For example, a power module can include a power supply, converter, battery, and the like for receiving and/or providing power via a power cable. A command and control module of UAV-mounted platform 210 can receive a signal based on the power module of UAV-mounted platform 210 being connected to the power module of UAV 205. The signal can, for example, provide the command and control module with an indication that a device is connected to the power module and, in some implementations, other power-related data, such as voltage or current going in and/or out of the power module, battery level, and/or the like.

The inclusion, in some implementations, of multiple interfaces of UAV-mounted platform 210 can enable UAV-mounted platform 210 to interface with a variety of different types of UAVs 205 and/or UAV flight controllers using a variety of different protocols, cords, adapters, and/or the like. For example, one type of UAV 205 can include a UART port that supports RS232 interface and a power module that supports power output capable of charging a battery of UAV-mounted platform. Another type of UAV 205 can include a micro USB port and no power module capable of providing power output. Another example UAV 205 can support Bluetooth communications and wireless inductive charging. A connection with each of the foregoing example types of UAVs 205, and/or other types of UAVs 205 with other ports and/or interfaces, can be supported by UAV-mounted platform 210 (e.g., an I/O module and/or power module of UAV-mounted platform 210 can support multiple different types of connections via multiple different interfaces).

In this way, UAV-mounted platform 210 can detect a connection with a UAV flight controller. This can enable, for example UAV-mounted platform 210 to identify a UAV identifier, or type of UAV, associated with the UAV flight controller.

As further shown in FIG. 5, process 500 can include identifying a UAV identifier associated with the UAV flight controller (block 520). For example, UAV-mounted platform 210 can, based on the connection between UAV-mounted platform 210 and the UAV flight controller, identify to which type of UAV flight controller the UAV-mounted platform 210 is connected. A UAV flight controller can be associated with one or more identifiers, and the UAV identifier, or type, can be identified in a variety of ways.

In some implementations, the UAV identifier associated with the UAV flight controller can be identified in a variety of ways, some more broadly than others, such as an identification based on a brand of UAV 205 or UAV flight controller, identification based on an interface for communicating with the UAV flight controller, identification based on an organization associated with UAV 205, and/or the like. In some implementations, the UAV identifier associated with the UAV flight controller can be identified in a more granular fashion, such as an identification based on UAV flight controller model number, identification based on UAV flight controller serial number, identification based on one or more software version numbers associated with the UAV flight controller, and/or the like.

In some implementations, the UAV identifier could have been previously identified and provided to UAV-mounted platform 210 (e.g., when UAV-mounted platform 210 was mounted or connected to UAV 205). For example, user input (e.g., provided using an I/O module or BVLOS module of UAV-mounted platform 210) can indicate the UAV identifier or type of UAV flight controller, which can be stored by UAV-mounted platform 210.

In some implementations, the UAV identifier can be identified based on the interface used to connect to the UAV flight controller. By way of example, for some types of UAV flight controllers, a UAV flight controller can be identified by the interface itself (e.g., a UAV identifier for a UAV flight controller that connects to UAV-mounted platform 210 using RS232 interface might be identified as an RS232-type). In some implementations, data transmitted to UAV-mounted platform 210 via the interface can be used to identify the UAV identifier associated with the UAV flight controller. For example, the UAV flight controller can provide UAV-mounted platform 210, via the interface, data identifying the UAV flight controller, such as a UAV flight controller brand name, model series, model number, serial number, software version number, and/or the like.

In some implementations, UAV-mounted platform 210 can identify the UAV flight controller as being associated with multiple UAV identifiers. For example, UAV-mounted platform 210 can determine one, some, or all of the following example UAV identifiers that could be associated with a UAV flight controller: a brand name, model series, model number, serial number, operating system, application identifier(s) (e.g., identifying applications operated or managed by the UAV flight controller), software version number(s), and/or the like. In some implementations, one or more UAV identifiers can identify a component of UAV 205 that is not included in the UAV flight controller (e.g., a UAV identifier can identify a UAV motor type, propeller type, peripheral type, and/or the like).

In some implementations, UAV-mounted platform 210 can identify one or more UAV identifiers by communicating with one or more other devices. For example, UAV-mounted platform 210 can obtain one or more UAV identifiers from UAV management device(s) 260, source device(s) 270, and/or client device(s) 280. By way of example, UAV-mounted platform 210 can obtain a serial number associated with the UAV flight controller though the interface connecting UAV-mounted platform 210 to the UAV flight controller. Using a BVLOS module, UAV-mounted platform 210 can transmit the serial number to UAV management device(s) 260 (e.g., using an LTE modem or the like). UAV-management device(s) 260 can provide UAV-mounted platform 210 with a response to the transmission, the response specifying one or more UAV identifiers associated with the UAV flight controller (e.g., UAV management device(s) 260 can query a database for identifiers associated with the serial number and provide the identifiers to UAV-mounted platform 210 via LTE transmission).

The capability of UAV-mounted platform 210 to identify a UAV identifier associated with UAV flight controller can enable UAV-mounted platform 210 to communicate with many different types of UAVs and UAV flight controllers. Additionally, or alternatively, UAV identifiers can be used to determine the availability and extent of BVLOS functionality that can be enabled by UAV-mounted platform 210 for a given UAV 205 or UAV flight controller.

In this way, UAV-mounted platform 210 can identify a UAV identifier associated with a UAV flight controller, enabling UAV-mounted platform 210 to determine an API for communicating with the UAV flight controller.

As further shown in FIG. 5, process 500 can include determining an API for communicating with the UAV flight controller, based on the UAV identifier (block 530). For example, UAV-mounted platform 210 can determine, based on the UAV identifier, an API that facilitates communication between the command and control module of UAV-mounted platform 210 and the UAV flight controller. An API can facilitate communications, for example, by providing UAV-mounted platform 210, including applications operating on UAV-mounted platform 210, with a set of subroutine definitions, protocols, and/or tools for an application operating on UAV-mounted platform 210 to communicate instructions to hardware and/or software of UAV 205 and/or the UAV flight controller of UAV 205.

In some implementations, UAV-mounted platform 210 can determine an API by referencing a table, database, or other set of data stored on UAV-mounted platform 210. For example, the command and control module of UAV-mounted platform 210 can use the UAV identifier to look up, in a local database, an API or software that uses a particular API.

In some implementations, UAV-mounted platform 210 can determine an API by communicating with one or more other devices. For example, UAV-mounted platform 210 can receive data identifying an API from UAV management device(s) 260, source device(s) 270, and/or client device(s) 280. By way of example, UAV-mounted platform 210 can use a BVLOS module to transmit a UAV identifier to UAV source device(s) 270 (e.g., using an LTE modem or the like). UAV source device(s) 270 can provide UAV-mounted platform 210 with a response to the transmission, the response specifying one or more APIs associated with the UAV identifier (e.g., UAV source device(s) 270 can obtain APIs associated with the UAV identifier from a database and provide the APIs, or data identifying the APIs, to UAV-mounted platform 210 via LTE transmission).

In some implementations, UAV-mounted platform 210 can determine multiple APIs. For example, UAV-mounted platform 210 can determine, based on one or more UAV identifiers associated with the UAV flight controller, that the UAV flight controller includes multiple applications for performing UAV functionality, such as an application for navigation, an application for collision avoidance, an application for operating a camera, and an application for communications. In this situation, UAV-mounted platform 210 can determine an API for one, some, or all of the applications included in the UAV flight controller. Determining multiple APIs can, in some implementations, enable one or more applications of UAV-mounted platform 210 to issue instructions that can be interpreted by each of the applications included in the UAV flight controller.

In this way, UAV-mounted platform 210 can determine an API for communicating with the UAV flight controller. The ability to communicate with multiple different types of UAVs and UAV flight controllers, using different APIs, can enable UAV-mounted platform 210 to communicate with many different types of software and/or hardware operating on many different types of UAV 205 and/or UAV flight controllers of different types of UAV 205. The ability to communicate using one or more APIs can facilitate BVLOS functionality, for example, by allowing various BVLOS applications of UAV-mounted platform 210 to communicate with various types of UAV 205.

As further shown in FIG. 5, process 500 can include establishing a communications link with the UAV flight controller using the API (block 540). For example, a command and control module of UAV-mounted platform 210 can include an application that uses the API to establish communications with the UAV flight controller via an I/O module of UAV-mounted platform 210. Establishing a communications link can include, in some implementations, sending data to the UAV flight controller and/or receiving data from the UAV flight controller through the interface connecting UAV-mounted platform 210 to the UAV flight controller. For example, an application operating on UAV-mounted platform 210 can issue an instruction to the UAV flight controller to determine that the devices can successfully communicate, thereby establishing a communications link.

In some implementations, a communications link can be established with the UAV flight controller based on the API and/or the interface connecting UAV-mounted platform 210 to the UAV flight controller. For example, particular APIs and/or interfaces can use particular protocols for communications that should be established (e.g., character encoding, framing of characters, error detection protocols, etc.) to enable an application operating on UAV-mounted platform 210 to communicate with the UAV flight controller.

In this way, UAV-mounted platform 210 can establish a communications link with the UAV flight controller. The capability of UAV-mounted platform 210 to establish a communications link with the UAV flight controller can enable UAV-mounted platform 210 to perform an action based on the communications link.

As further shown in FIG. 5, process 500 can include performing an action based on the communications link (block 550). For example, UAV-mounted platform 210 can perform an action that is based the communications link between UAV-mounted platform 210 and the UAV flight controller of UAV 205. In some implementations, actions can include and/or be based on data provided to UAV-mounted platform 210 and/or the UAV flight controller through the communications link (e.g., a variety of actions can be performed by a command and control module of UAV-mounted platform 210 using the communications link).

In some implementations, UAV-mounted platform 210 can perform an action that includes executing instructions of one or more BVLOS applications to cause one or more actions to occur. For example, UAV-mounted platform 210 can include a BVLOS application that causes the UAV-mounted platform 210 to perform an action, such as send data regarding UAV 205 to UAV management device(s) 260, source device(s) 270, and/or client device(s) 280. As another example, UAV-mounted platform 210 can include a BVLOS application that causes UAV-mounted platform 210 to cause the flight controller of UAV 205 to perform an action (e.g., UAV-mounted platform 210 can send instructions to the flight controller via the communications link, and the instructions can cause UAV 205 to perform an action, such as send data regarding UAV 205 to UAV-mounted platform).

By way of example, an action that can be performed based on the communications link can include causing a software installation, removal, and/or update to occur. For example, UAV-mounted platform 210 can receive, from UAV management device(s) 260, source device(s) 270, and/or client device(s) 280, external data for installing, removing, and/or updating software for UAV-mounted platform 210 and/or UAV 205. One example might include receiving, from UAV management device(s) 260, data that causes UAV-mounted platform 210 to install a new BVLOS application for UAV-mounted platform 210. Another example might include receiving, from source device(s) 270, data that causes UAV-mounted platform 210 to update firmware for the flight controller of UAV 205 (e.g., using the communications link and the API to provide firmware installation instructions to the flight controller). The ability to install, remove, and/or update software while UAV 205 is BVLOS can facilitate faster and more efficient managing of UAV 205 software and/or UAV-mounted platform 210 software, relative to software management methods that require VLOS communications and/or specific hardware.

Another example action that can be performed based on the communications link can include causing a navigational change for UAV 205. For example, UAV 205 can be stationary, under manual control of a pilot, moving in a particular direction, and/or moving towards a waypoint. UAV management device(s) 260 (or source device(s) 270 or client device(s) 280) can provide UAV-mounted platform 210 with instructions to cause UAV 205 to make a navigational change, such as update destination waypoint(s) or cause UAV 205 to land. The instructions provided by UAV management device(s) 260 can, for example, be executed by UAV-mounted platform 210 (e.g., using a BVLOS navigation application executed by the command and control module of UAV-mounted platform 210). The instructions can cause UAV-mounted platform 210 to send the flight controller of UAV 205, via the communications link and using the API, instructions that cause the flight controller to make the navigational change. The ability to cause UAV 205 to make a navigational change while UAV 205 is BVLOS can facilitate safer and more efficient navigation of UAV 205, relative to navigation methods that require VLOS communications and/or methods that rely on navigation software of UAV 205.

Yet another example action that can be performed based on the communications link can include receiving data from UAV 205. In some implementations, the flight controller of UAV 205 might have access to a variety of data regarding UAV 205, including data received from sensors of UAV 205. The flight controller UAV 205 can provide data to UAV-mounted platform 210 via the communications link. For example, the flight controller of UAV 205 can provide UAV-mounted platform 210 with navigational data, sensor data (e.g., live streaming video), payload data, and/or the like.

The data provided by the flight controller can, in some implementations, be used by one or more BVLOS applications of UAV-mounted platform 210. For example, a navigation application executed by UAV-mounted platform 210 can receive navigational data (e.g., UAV bearing, speed, waypoint(s), and/or the like) via the communications link. Additionally, or alternatively, UAV-mounted platform 210 can receive data directly from a sensor of UAV 205 via the communications link, obviating the use of the UAV flight controller to pass data to UAV-mounted platform 210. The ability to receive data from UAV 205 can enable functionality provided by one or more BVLOS applications operating on UAV-mounted platform.

As another example action that can be performed based on the communications link, UAV-mounted platform 210 can provide data to UAV 205 (e.g., data that can be used for functions performed by UAV 205). For example, UAV 205 can include various applications for performing a variety of functions, such as a navigational application for navigating UAV 205, a collision avoidance application for avoiding potential collisions, a power management application for managing UAV 205 power, a payload application for handling a payload of UAV 205, and/or the like. In some implementations, UAV-mounted platform 210 can provide data to UAV 205 for use by a UAV application. For example, UAV-mounted platform 210 can receive (e.g., from UAV management device(s) 260, source device(s) 270, and/or client device(s) 280) weather data indicating a storm near UAV 205, and UAV-mounted platform 210 can provide the weather data to the flight controller of UAV 205, enabling a navigation application of UAV 205 to use the weather data to take an action, such as update a course, change a waypoint, and/or land UAV 205.

As another example of providing data to UAV 205 using the communications link, UAV-mounted platform 210 can include an electromagnetic proximity sensor for sensing nearby objects and, based on the detection of a nearby object by the proximity sensor, UAV-mounted platform 210 can provide UAV 205 with data indicating the nearby object. The data can enable a collision avoidance application of UAV 205 to use the data to cause UAV 205 to take action to avoid a collision with the nearby object. By providing UAV 205 with data using the communications link, UAV-mounted platform 210 can enable UAV 205 to use data that might not have otherwise been available to UAV 205.

As yet another example of providing data to UAV 205 using the communications link, UAV-mounted platform 210 can provide UAV 205 with real time kinematic (RTK) data. For example, UAV-mounted platform 210 can include a BVLOS application for performing real time kinematic (RTK) satellite navigation (e.g., in a manner designed to enhance the accuracy of GPS signals received from a GPS component of UAV-mounted platform 210 or UAV 205). The RTK application can provide position and/or navigational data to UAV 205 (e.g., to provide UAV 205 with position and/or navigational data that can be more accurate than GPS data provided by a GPS component of UAV 205).

Alternatively, or in addition to the examples provided above, the communications link between UAV-mounted platform 210 and the flight controller of UAV 205 can enable many other actions to be performed, providing a variety of BVLOS functionality. For example, the communications link can allow a BVLOS application of UAV-mounted platform 210 to perform any of the following example actions: control a camera of UAV 205, perform image processing on images captured by a camera of UAV 205, send images and/or image processing results to a third party device, control motors of UAV 205, read and report the battery level of a battery of UAV 205, send navigational data to a third party device, and/or the like.

In some implementations, the BVLOS functionality can also include, in addition to or alternatively to the examples provided above, UAV functionality that could be provided by traditional VLOS communications, including any command and control functionality for operating UAV 205, such as functionality for taking direct control over piloting UAV 205. In some implementations, the actions performed by UAV-mounted platform 210, and/or by a BVLOS application operating on UAV-mounted platform 210, can be caused by and/or reported to external devices, such as UAV management device(s) 260, source device(s) 270, and/or client device(s) 280 (e.g., using a BVLOS communications module of UAV-mounted platform 210). For example, actions that can be performed by a BVLOS application of UAV-mounted platform 210 can, in some implementations, be performed, in whole or in part, by an external third party device (e.g., UAV management device(s) 260, source device (s) 270, and/or client device(s) 280). Results of actions provided by an external third party device can be provided to UAV-mounted platform 210 using a BVLOS module of UAV-mounted platform 210, and then provided to UAV 205 via the communications link.

In this way, UAV-mounted platform 210 can perform an action based on the communications link with the UAV flight controller. The capability of UAV-mounted platform 210 to perform an action can enable UAV-mounted platform 210 to provide a wide variety of BVLOS functionality to UAV 205.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Some implementations of UAV-mounted platform 210 described herein can improve the functionality of a UAV by providing, for example, a UAV agnostic device that can improve the safety and efficiency of UAV operations. Safety can be improved, for example, by providing a UAV and/or UAV-mounted platform 210 with data while the UAV is beyond visual line of sight (e.g., data that can be used by one or more applications of the UAV and/or UAV-mounted platform 210 to make safe navigational decisions). Efficiency can be improved, for example, by providing a UAV and/or UAV-mounted platform 210 with data that can cause software updates, navigational updates, and/or other data while the UAV is beyond visual line of sight. In addition, the ability for UAV-mounted platform 210 to interface with multiple different types of UAVs 205 can improve efficiency of BVLOS command and control by obviating the need to use different types of hardware and/or software to interface with different UAVs.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the terms "component" and "module" are intended to be broadly construed as hardware, firmware, or a combination of hardware and software.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An unmanned aerial vehicle (UAV)-mounted device, comprising:
   one or more memories storing a plurality of application programming interfaces (APIs), and
   one or more processors, communicatively coupled to the one or more memories, to:
      detect a physical connection with a UAV flight controller through an interface;
      identify a UAV identifier associated with the UAV flight controller;
      determine, based on the UAV identifier, an API for communicating with the UAV flight controller,
         wherein the API is one of the plurality of APIs stored by the UAV-mounted device,
         wherein the plurality of APIs correspond to a plurality of different types of UAVs,
         wherein each API, of the plurality of APIs, corresponds to at least one UAV identifier of a respective type of UAV of the plurality of different types of UAVs, and
         wherein the one or more processors, when determining the API, are to:
            determine the API by using the UAV identifier to reference, in a set of API data stored by the UAV-mounted device, data specifying the API, or
            determine the API by:
               transmitting the UAV identifier to a UAV source device, and
               receiving, from the UAV source device, the data specifying the API;
      establish a communications link with the UAV flight controller using the API; and
      perform an action based on the communications link.

2. The UAV-mounted device of claim 1, further comprising:
   a plurality of interfaces for physically connecting to the different types of UAVs, where the plurality of interfaces includes the interface.

3. The UAV-mounted device of claim 1, where the interface is a serial communications interface.

4. The UAV-mounted device of claim 1, where:
   the UAV identifier is one of a plurality of UAV identifiers, and
   where the one or more processors, when identifying the UAV identifier associated with the UAV flight controller, are to:
      identify the UAV identifier from the plurality of UAV identifiers based on data received through the interface.

5. The UAV-mounted device of claim 1, further comprising:
   a radio access network (RAN) communications component for communicating with a separate device that is separate from the UAV-mounted device.

6. The UAV-mounted device of claim 5, where the one or more processors are further to:
   receive, from the separate device and by the RAN communications component, one or more instructions, and
   where the action is performed based on the one or more instructions.

7. The UAV-mounted device of claim 5, where the one or more processors are further to:
   receive UAV data from the UAV flight controller; and
   provide, to the separate device and by the RAN communications component, the UAV data.

8. The UAV-mounted device of claim 5, where the RAN communications component includes a long-term evolution (LTE) modem.

9. A non-transitory computer-readable medium storing instructions, the instructions comprising:
   one or more instructions that, when executed by one or more processors of an unmanned aerial vehicle (UAV)-mounted device storing a plurality of application programming interfaces (APIs), cause the one or more processors to:
      detect a physical connection with a UAV flight controller through an interface;
      identify a UAV identifier associated with the UAV flight controller;
      determine, based on the UAV identifier, an API for communicating with the UAV flight controller,
         wherein the API is one of a plurality of APIs stored by the UAV-mounted device,
         wherein the plurality of APIs correspond to a plurality of different types of UAVs,
         wherein each API, of the plurality of APIs, corresponds to at least one UAV identifier of a respective type of UAV of the plurality of different types of UAVs, and
         wherein the one or more instructions, that cause the one or more processors to determine the API, cause the one or more processors to:
            determine the API by using the UAV identifier to reference, in a set of API data stored by the UAV-mounted device, data specifying the API, or
            determine the API by:
               transmitting the UAV identifier to a UAV source device, and
               receiving, from the UAV source device, the data specifying the API;
      establish a communications link with the UAV flight controller using the API; and
      perform an action based on the communications link.

10. The non-transitory computer-readable medium of claim 9, where the one or more instructions, that cause the one or more processors to perform the action based on the communications link, cause the one or more processors to:
    send, using the interface, data to the UAV flight controller.

11. The non-transitory computer-readable medium of claim 9, where the one or more instructions, that cause the one or more processors to perform the action based on the communications link, cause the one or more processors to:
   receive, using the interface, UAV data from the UAV flight controller.

12. The non-transitory computer-readable medium of claim 9, where the one or more instructions, that cause the one or more processors to perform the action based on the communications link, cause the one or more processors to:
   provide, using the API and the interface, the UAV flight controller with instructions that cause the UAV to perform an action.

13. The non-transitory computer-readable medium of claim 9, where the one or more instructions, when executed by the one or more processors, further cause the one or more processors to:
   receive, from a separate device and using a radio access network (RAN) communications device in communication with the one or more processors, external data, and
   wherein the action is performed based on the external data.

14. A method comprising:
   detecting, by an unmanned aerial vehicle (UAV)-mounted platform storing a plurality of APIs, a physical connection with a UAV flight controller through an interface;
   identifying, by the UAV-mounted platform, a UAV identifier associated with the UAV flight controller;
   determining, by the UAV-mounted platform and based on the UAV identifier, an application programming interface (API) for communicating with the UAV flight controller,
      wherein the API is one of the plurality of APIs stored by the UAV-mounted platform,
      wherein the plurality of APIs correspond to a plurality of different types of UAVs,
      wherein each API, of the plurality of APIs, corresponds to at least one UAV identifier of a respective type of UAV of the plurality of different types of UAVs, and
      wherein determining the API comprises:
         determining the API by using the UAV identifier to reference, in a set of API data stored by the UAV-mounted platform, data specifying the API, or
         determining the API by:
            transmitting the UAV identifier to a UAV source device, and
            receiving, from the UAV source device, the data specifying the API;
   establishing, by the UAV-mounted platform, a communications link with the UAV flight controller using the API; and
   performing, by the UAV-mounted platform, an action based on the communications link.

15. The method of claim 14, further comprising:
   receiving, from a separate device and using a radio access network (RAN) communications device included in the UAV-mounted platform, external data.

16. The method of claim 15, where performing, by the UAV-mounted platform, the action based on the communications link comprises:
   generating, based on the external data, UAV instructions using the API; and
   providing, using the interface, the UAV instructions to the UAV flight controller.

17. The method of claim 15, where performing, by the UAV-mounted platform, the action based on the communications link comprises:
   providing, using the interface, the external data to the UAV flight controller,
   the external data causing the UAV flight controller to at least one of:
      install software;
      update software; or
      remove software.

18. The method of claim 14, further comprising:
   detecting a second connection with a second UAV flight controller through a second interface;
   identifying a second UAV identifier associated with the second UAV flight controller;
   determining, based on the second UAV identifier, a second API for communicating with the second UAV flight controller,
      the second API being different from the API, and
      where determining the second API comprises:
         determining the second API by using the second UAV identifier to reference, in the set of API data stored by the UAV-mounted platform, data specifying the second API, or
         determining the second API by:
            transmitting the second UAV identifier to the UAV source device, and
            receiving, from the UAV source device, data specifying the second API;
   establishing a second communications link with the second UAV flight controller using the second API; and
   performing a second action based on the second communications link.

19. The UAV-mounted device of claim 1, where the one or more processors, when performing the action, are to:
   generate UAV instructions using the API; and
   provide, using the API, the UAV instructions to the UAV flight controller.

20. The UAV-mounted device of claim 1, where the one or more processors, when performing the action, are to:
   provide instructions to the UAV flight controller,
   the instructions causing the UAV flight controller to at least one of:
      install software;
      update software; or
      remove software.

* * * * *